US008881337B2

(12) United States Patent
Boland

(10) Patent No.: US 8,881,337 B2
(45) Date of Patent: Nov. 11, 2014

(54) WINDSCREEN WIPER DEVICE

(75) Inventor: Xavier Boland, Arlon (BE)

(73) Assignee: Federal-Mogul S.A., Aubange (BE)

( * ) Notice: Subject to any disclaimer, the term of this patent is extended or adjusted under 35 U.S.C. 154(b) by 911 days.

(21) Appl. No.: 12/501,768

(22) Filed: Jul. 13, 2009

(65) Prior Publication Data

US 2011/0005019 A1 Jan. 13, 2011

(30) Foreign Application Priority Data

Jul. 11, 2008 (EP) .................................. 08160187

(51) Int. Cl.
B60S 1/40 (2006.01)
B60S 1/34 (2006.01)
B60S 1/44 (2006.01)
B60S 1/38 (2006.01)

(52) U.S. Cl.
CPC ............... B60S 1/4038 (2013.01); B60S 1/345 (2013.01); B60S 1/381 (2013.01); B60S 2001/382 (2013.01); B60S 1/3436 (2013.01); B60S 1/44 (2013.01); B60S 1/3848 (2013.01); B60S 2001/3825 (2013.01)
USPC ................ 15/250.32; 15/250.351; 15/250.43

(58) Field of Classification Search
USPC ............ 15/250.32, 250.361, 250.43, 250.44, 15/250.201, 250.351, 250.29, 15/250.451–250.454, 250.31
See application file for complete search history.

(56) References Cited

U.S. PATENT DOCUMENTS

| 2,613,385 | A | * | 10/1952 | Wylie ....................... 15/250.351 |
| 2,890,472 | A | * | 6/1959 | Olson ....................... 15/250.352 |
| 3,387,316 | A | * | 6/1968 | Pearse ....................... 15/250.351 |
| 3,428,996 | A | * | 2/1969 | Carpenter .................. 15/250.24 |
| 3,480,985 | A | | 12/1969 | Forster |
| 3,480,986 | A | | 12/1969 | Forster |
| 6,651,292 | B2 | * | 11/2003 | Komerska .................. 15/250.32 |
| 7,305,734 | B2 | * | 12/2007 | Boland et al. ............. 15/250.32 |
| 2002/0112306 | A1 | | 8/2002 | Komerska |
| 2003/0009842 | A1 | * | 1/2003 | Egner-Walter ............. 15/250.43 |
| 2003/0167587 | A1 | * | 9/2003 | Egner-Walter ............. 15/250.43 |
| 2004/0006840 | A1 | | 1/2004 | Zimmer |
| 2008/0028562 | A1 | | 2/2008 | Lin |

(Continued)

FOREIGN PATENT DOCUMENTS

DE 19650929 * 6/1998
DE 10038396 A1 3/2002

(Continued)

OTHER PUBLICATIONS

Communication of a notice of opposition for EP2143602 dated Oct. 15, 2012.

Primary Examiner — Gary Graham
(74) Attorney, Agent, or Firm — Robert L. Stearns; Dickinson Wright, PLLC

(57) ABSTRACT

A windscreen wiper device, particularly for automobiles, includes comprising an elastic, elongated carrier element, as well as an elongated wiper blade of a flexible material, which can be placed in abutment with a windscreen to be wiped, which wiper blade is of the flat blade type and includes at least one groove, in which groove a longitudinal strip of the carrier element is disposed. The windscreen wiper device further includes a mounting head for transferring a reciprocal movement to the wiper blade, with the special feature of a connecting device for detachably connecting the wiper blade directly to the mounting head, wherein the connecting device is positioned near one end of the wiper blade.

7 Claims, 4 Drawing Sheets

(56) References Cited

U.S. PATENT DOCUMENTS

| | | | |
|---|---|---|---|
| 2008/0104784 A1* | 5/2008 | Cerdan | 15/103 |
| 2008/0201891 A1 | 8/2008 | Kraemer | |
| 2008/0209662 A1* | 9/2008 | Wilms et al. | 15/250.351 |

FOREIGN PATENT DOCUMENTS

| | | | |
|---|---|---|---|
| DE | 10040129 A1 | 6/2002 |
| DE | 10210720 A1 | 10/2003 |
| DE | 202006009435 U1 | 8/2006 |
| DE | 10 2005 048344 A1 | 4/2007 |
| EP | 1403156 A1 | 3/2004 |
| EP | 1486389 A2 | 12/2004 |
| EP | 1514752 | 3/2005 |
| EP | 1844995 A2 | 10/2007 |
| FR | 2487758 A1 | 2/1982 |
| FR | 2551709 A1 | 3/1985 |
| FR | 2727367 A1 | 5/1996 |
| FR | 2 732 287 A | 10/1996 |
| FR | 2732287 A1 | 10/1996 |
| FR | 2866298 A1 | 8/2005 |
| FR | 2 890 925 A | 3/2007 |
| GB | 524720 A | 8/1940 |
| WO | 0212033 A1 | 2/2002 |
| WO | 2007006884 A1 | 1/2007 |

\* cited by examiner

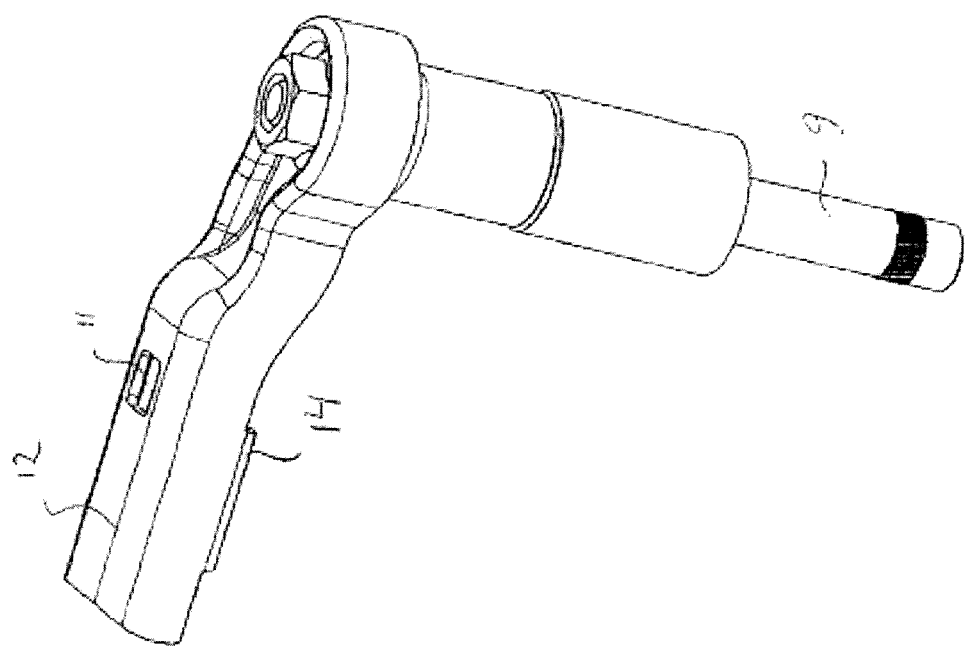
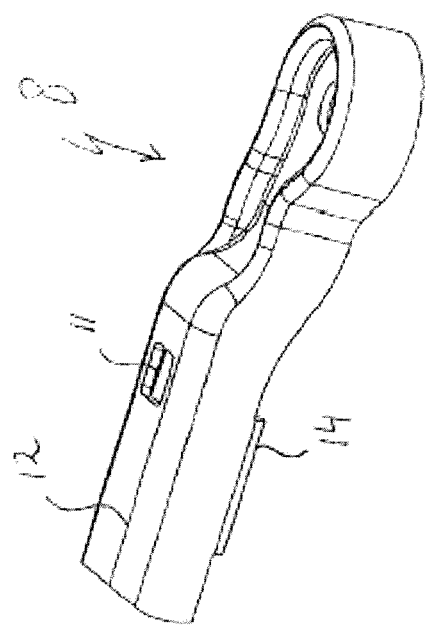
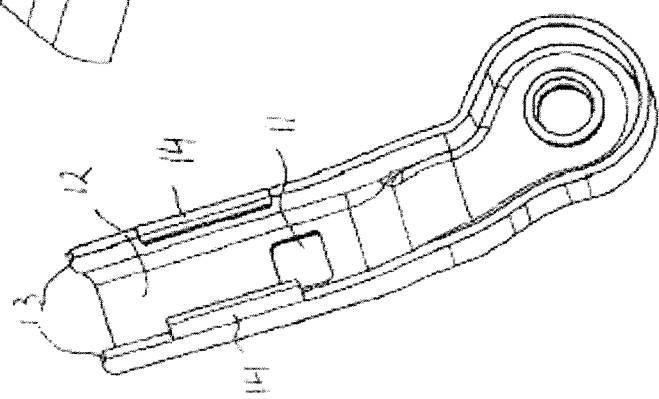
Fig. 2

WINDSCREEN WIPER DEVICE

This application claims priority to European Patent Application No. 08160187.4, filed Jul. 11, 2009, and is incorporated herein by reference.

BACKGROUND OF THE INVENTION

1. Technical Field

The invention relates to a windscreen wiper device, particularly for automobiles, comprising an elastic, elongated carrier element, as well as an elongated wiper blade of a flexible material, which can be placed in abutment with a windscreen to be wiped, which wiper blade is of the flat blade type and includes at least one groove, in which groove a longitudinal strip of the carrier element is disposed, wherein the windscreen wiper device further comprises a mounting head for transferring a reciprocal movement to the wiper blade.

It is noted that the present invention is not restricted to cars, but also refers to rail coaches and other (fast) vehicles.

2. Related Art

Such a windscreen wiper device is known from European patent publication no. 1 514 752 (Federal-Mogul S. A.). The windscreen wiper device described in this European patent publication comprises a mounting head mountable on a drive shaft and an arm member pivotally connected to the mounting head by means of a pivot pin, wherein the arm member has a substantially U-shaped cross-section near the pivot pin comprising two side walls, wherein a part of the mounting head extends between the side walls and beyond the pivot pin.

A disadvantage of the windscreen wiper arm known from the above European patent publication is that it comprises many complex parts with a dedicated shape, wherein reference is made to the oscillating arm described therein consisting of a plastic arm member at one end thereof pivotally connected to a mounting head by means of a pivot pin and at the other end thereof folded around a rod-like part. Obviously, this needs complex machinery, tools, with all the expenses involved.

SUMMARY OF THE INVENTION

It is an object of the invention to obviate this disadvantage, in the sense that at minimum costs—without using complex machinery and additional tools—a simple though effective windscreen wiper device is proposed which fits on all kinds of different cars.

Thereto, according to the invention a windshield wiper arm is characterized in that the windscreen wiper device further comprises a connecting device for detachably connecting the wiper blade directly to the mounting head, wherein the connecting device is positioned near one end of the wiper blade. Preferably, the windscreen wiper device further comprises a connecting piece positioned near the other end of the wiper blade and connected to one end of the longitudinal strip. The goal of the present invention is to refrain from the use of an intermediate oscillating arm, thereby avoiding an articulation between the oscillating arm and the wiper blade, as well as between the mounting head and the oscillating arm. This not only ensures that less parts have to be used in manufacturing the windscreen wiper device with all advantages involved (such as cheaper, lighter, less plastic material sensitive to UV-light), but also that disadvantages like wear are obviated. Further, by directly connecting the connecting device to the mounting head, the wiper blade is mounted closer to the windscreen to be wiped, so that the wiping properties are improved. Advantageously, the connecting device and the connecting piece are connected to the wiper blade at opposite ends thereof.

The connecting device and the mounting head are each preferably made of one piece. The present windscreen wiper device is particularly designed for use at a rear window of a car.

Preferably, the wiper blade includes opposing longitudinal grooves on its longitudinal sides, in which grooves spaced-apart longitudinal strips of the carrier element are disposed, wherein neighbouring ends of the longitudinal strips are interconnected by the connecting device at one end of the wiper blade and by the connecting piece at the other end of the wiper blade. The connecting device may be glued, soldered, clipped, snapped or welded onto the longitudinal strips.

In a preferred embodiment of a windscreen wiper device in accordance with the invention the longitudinal strip is biassed in such a way that its curvature near the connecting device is larger than that its curvature near the other end of the wiper blade, all seen in dismounted position. In other words, in dismounted position the wiper blade has an asymmetric shape, seen along its middle transverse plane perpendicular to a windscreen to be wiped. Thus, the wiper blade is able to follow any curvature of a windscreen to be wiped, while the wiper blade is pressed onto the windscreen to be wiper with sufficient force to enhance the wiping properties.

In a further preferred embodiment of a windscreen wiper device according to the invention the interconnection between the mounting head and the wiper blade does not allow any pivotal movement. In other words, in mounted position the mounting head and the connecting device cannot move relative to one another, i.e. are stationary with respect to each other.

In a further preferred embodiment of a windscreen wiper device in accordance with the invention the mounting head is fixed for rotation to a shaft, wherein the shaft is rotatable alternately in a clockwise and in a counter-clockwise sense carrying the mounting head into rotation. Thus, in turn the mounting head draws the connecting device into rotation and thereby moves the wiper blade. In the alternative, the mounting head is fixed for translation to a carriage, wherein the carriage can be translated alternately in a one linear direction and in another counter linear direction carrying the mounting head into translation. The present invention can therefore be used for circular or linear movement of the mounting head.

In a further preferred embodiment of a windscreen wiper device according to the invention the connecting device comprises at least one resilient tongue engaging in a correspondingly shaped hole provided in the mounting head, and wherein the resilient tongue is movable between a outward position retaining the wiper blade onto the mounting head and an inward position releasing the wiper blade from the mounting head. In order to connect the wiper blade onto the mounting head, the resilient tongue is initially pushed in against a spring force—as if it were a push button—and then allowed to spring back into the hole provided in the mounting head, thus snapping, that is clipping the resilient tongue into the hole. By subsequently pushing in again the resilient tongue against the spring force, the wiper blade may be released from the mounting head. Particularly, the hole has a closed circumference. Preferably, the resilient tongue is hingeable along an hinge axis, wherein the hinge axis is orientated towards the mounting head (so that the resilient tongue opens away from the mounting head) or facing away from the mounting head near an outer edge of the joint part (so that the resilient tongue opens towards the mounting head). Particularly, the hinge axis is located at an outer edge of the connecting device.

In a further preferred embodiment of a windscreen wiper device in accordance with the invention the mounting head has an at least substantially U-shaped cross-section at the location of its attachment to the connecting device, wherein each leg of the U-shaped cross-section comprises clamping members formed as inwardly bend edges at the end of the legs, which engage around longitudinal sides of the connecting device that face away from each other. Hence, a transverse locking of the connecting device inside the mounting head is achieved.

In a further preferred embodiment of a windscreen wiper device according to the invention the hole is provided in a base of the U-shaped cross-section of the mounting head. In this embodiment the resilient tongue may be provided on an upper part of the connecting device. In addition thereto or instead thereof the connecting device may be provided with at least two lateral resilient tongues extending outwardly, wherein each tongue engages in a correspondingly shaped hole provided in each leg of the U-shaped cross-section of the mounting head. The holes preferably have a closed circumference. Such closed holes enhance the retention of the connection device onto the mounting head in all possible directions, particularly both horizontally and vertically.

THE DRAWINGS

The invention will now be explained in more detail with reference to figures illustrated in a drawing, wherein:

FIG. 2 shows several perspective, schematic views of a mounting head as used in FIG. 1;

DETAILED DESCRIPTION

Figure 1:
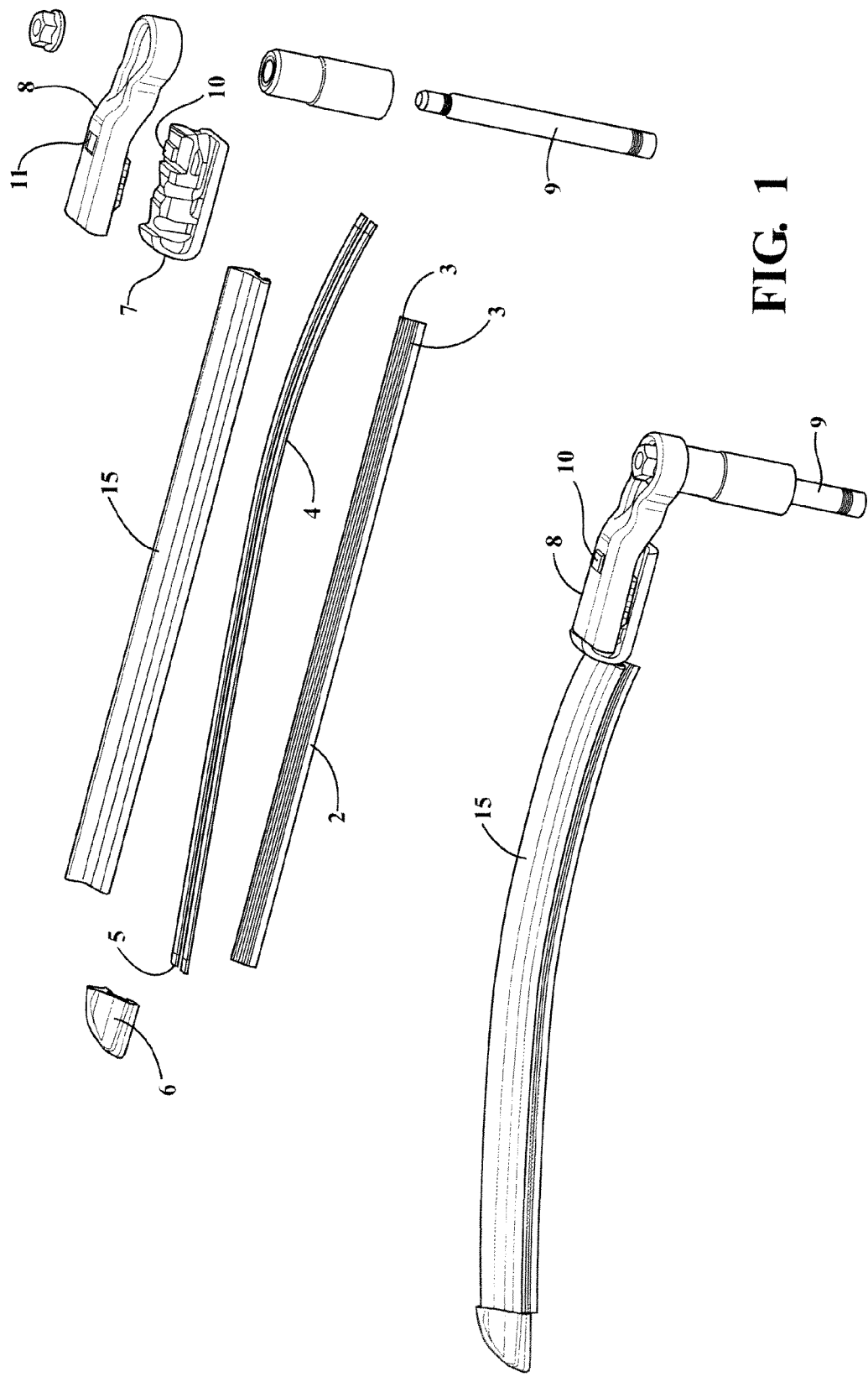
FIG. 1 is a perspective, schematic and exploded view of a preferred embodiment of a windscreen wiper device in accordance with the invention.

The windscreen wiper device 1 is built up of an elastomeric wiper blade 2, in the longitudinal sides of which opposing longitudinal grooves 3 are formed, and of longitudinal strips 4 made of spring band steel, which are fitted in the longitudinal grooves 3. The strips 4 form a flexible carrier element for the wiper blade 2, as it were, which is thus biassed in a curved position (the curvature in operative position being that of a windscreen to be wiped).

Neighbouring ends 5 of the strips 4 at one end of the wiper blade 2 are interconnected by means of a connecting piece 6 or "end cap" functioning as clamping member. In this embodiment, the connecting piece 6 is a separate constructional element, which may be form-locked ("positive locking" or "having a positive fit") or force-locked to the ends 5 of the strips 4. In another preferred embodiment, the connecting piece 6 is in one piece with the strips 4 made of spring band steel. In the latter case the connecting piece 6 forms a transverse bridge for the strips 4, as it were.

The windscreen wiper device 1 is furthermore built up of a connecting device 7 of plastic material for a mounting head 8. Alternatively, the connecting device 7 may also be made of metal, such as steel or aluminum. The connecting device 7 may comprise clamping members that are integral therewith, which engage around longitudinal sides of the strips 4 that face away from each other, as a result of which the connecting device 7 is firmly attached to the unit consisting of the wiper blade 2 and the strips 4. As can be seen, the connecting device 7 is connected to the wiper blade 2 at its other end, that is opposite the connecting piece 6.

Figure 3:
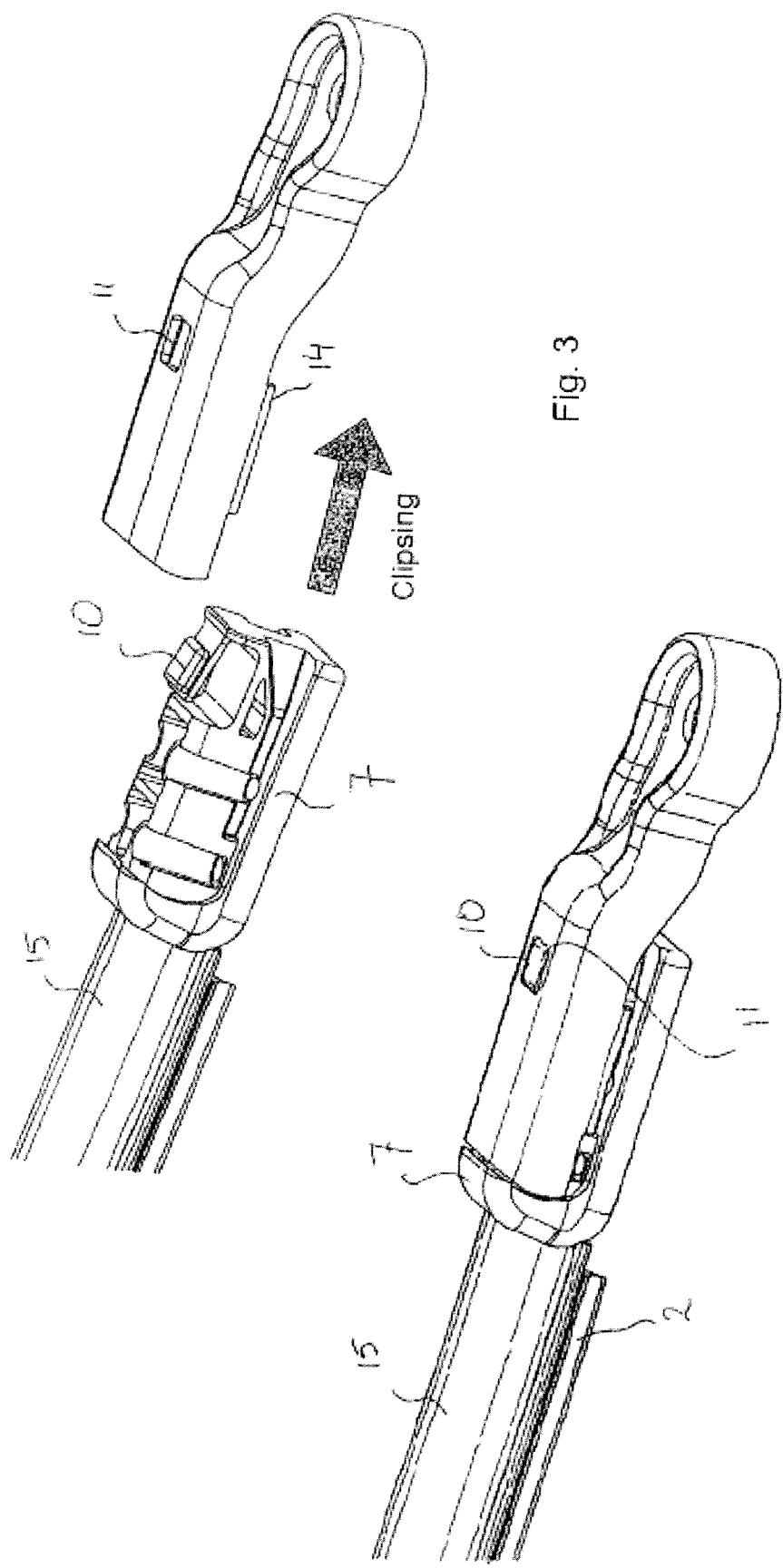
FIG. 3 shows various successive steps for fitting the connecting device and the mounting head of FIG. 2 together.

As illustrated in FIGS. 1 through 3 the windscreen wiper device 1 according to the invention comprises a plastic or metallic mounting head 8 which can be fixed for rotation to a shaft 9 driven, via a mechanism not illustrated, by a small motor. In use, the shaft 9 rotates alternately in a clockwise and in a counter-clockwise sense carrying the mounting head 8 into rotation also, which in turn draws the connecting device 7 in rotation and thereby moves the wiper blade 2.

With reference to FIGS. 2 and 3 the connecting device 7 comprises one resilient tongue 10 extending outwardly, while the mounting head 8 has an U-shaped cross-section at the location of its connection to the connecting device 7, so that the tongue 10 engages in an identically shaped hole 11 provided in a base 12 of the U-shaped cross-section.

FIG. 3 shows the steps of mounting the connecting device 7 with the wiper blade 2 (not shown) onto the mounting head 8. The connecting device 7 can be easily slid in horizontal direction on a free end of the mounting head 8. During this sliding movement the resilient tongue 10 is initially pushed in against a spring force and then allowed to spring back into the hole 11, thus snapping, that is clipping the resilient tongue 10 into the hole 11. This is a so-called bayonet-connection. The mounting head 8 together with the connecting device 7 are then ready for use. By subsequently pushing in again the resilient tongue 10 against the spring force (as if it were a push button), the connecting device 7 together with the wiper blade 2 (not shown) may be released from the mounting head 8. Dismounting the connecting device 7 with the wiper blade 2 (not shown) from the mounting head 8 is thus realized by sliding the connecting device 7 together with the wiper blade 2 (not shown) in a direction away from the mounting head 8.

Each leg 13 of the U-shaped cross-section of the mounting head 8 comprises clamping members formed as inwardly bended edges 14 integral with the legs 13, wherein during use the edges 14 engage round longitudinal sides of the connecting device 7 that face away from each other. Thus an enhanced retention of the connecting device 7 onto the mounting head 8 is achieved in vertical direction, that is perpendicular to the longitudinal direction of the mounting head 8.

Figure 4:
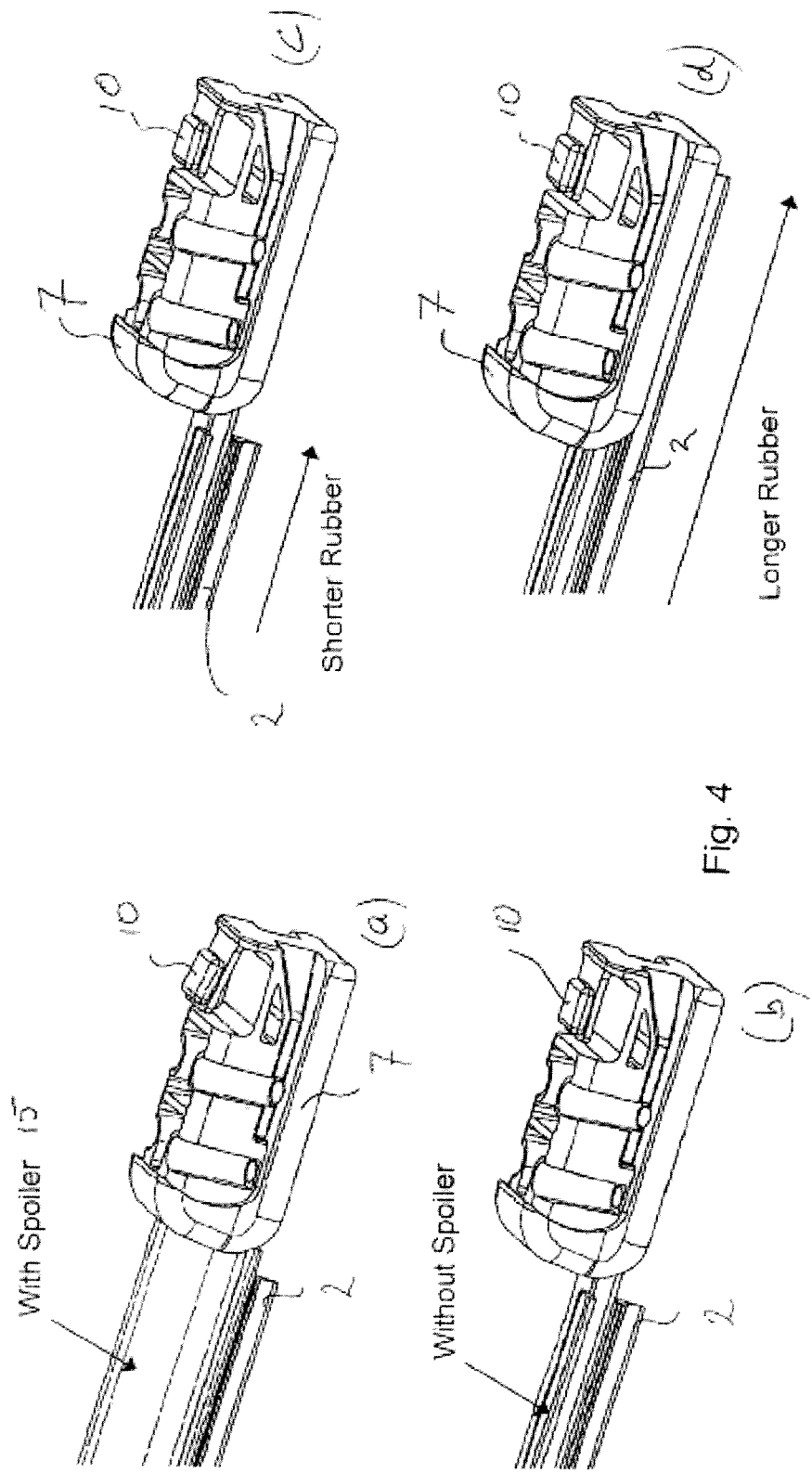
FIG. 4 relates to several views of a connecting device of FIGS. 2 and 3.

FIG. 4 relates to several views of the wiper blade 2 of FIGS. 1, 2 and 3. As can be seen, the wiper blade 2 may be equipped with or without a spoiler 15 (FIGS. 4a and 4b), while the wiper blade 2 as such may or may not extend under the connecting device 7 (FIGS. 4c and 4d).

The invention is not restricted to the variants shown in the drawing, but it also extends to other embodiments that fall within the scope of the appended claims.

What is claimed is:

1. A windscreen wiper device, comprising an elastic, elongated carrier element, as well as an elongated wiper blade of a flexible material, which can be placed in abutment with a windscreen to be wiped, which wiper blade includes at least one groove, in which groove a longitudinal strip of the carrier element is disposed, wherein said windscreen wiper device further comprises a mounting head for transferring a reciprocal movement to said wiper blade, and a connecting device for detachably connecting said wiper blade directly to said mounting head though a bayonet connection, wherein said connecting device covers a first terminal end of said longitudinal strip and is positioned substantially adjacent to one end of said wiper blade to engage said mounting head substantially adjacent said end of said wiper blade, wherein an end cap covers a second terminal end of said longitudinal strip, wherein said connecting device and said end cap are connected to said wiper blade at opposite ends thereof, wherein said connecting device comprises at least one resilient tongue of said bayonet connection engaging in a correspondingly shaped hole of said bayonet connection provided in said mounting head, and wherein said resilient tongue is allowed to be pushed in against said spring force to allow for sliding of said connecting device away from said mounting head in order to release said wiper blade from said mounting head.

2. A windscreen wiper device according to claim 1, wherein said longitudinal strip is biassed in such a way that its curvature near the connecting device is larger than its curvature near the other end of said wiper blade.

3. A windscreen wiper device according to claim 1, wherein an interconnection between the mounting head and the wiper blade does not allow any pivotal movement therebetween.

4. A windscreen wiper device according to claim 1, wherein said mounting head is fixed for rotation to a shaft, and wherein said shaft is rotatable alternately in a clockwise and in a counter-clockwise sense carrying said mounting head into rotation.

5. A windscreen wiper device, comprising an elastic, elongated carrier element as well as an elongated wiper blade of a flexible material, which can be placed in abutment with a windscreen to be wiped, which wiper blade includes at least one groove, in which groove a longitudinal strip of the carrier element is disposed, wherein said windscreen wiper device further comprises a mounting head for transferring a reciprocal movement to said wiper blade, and a connecting device for detachably connecting said wiper blade directly to said mounting head through a bayonet connection, wherein said connecting device is positioned substantially adjacent to one end of said wiper blade, wherein said connecting device and an end cap are connected to said wiper blade at opposite ends thereof, wherein said connecting device comprises at least one resilient tongue of said bayonet connection engaging in a correspondingly shaped hole of said bayonet connection provided in said mounting head and wherein said resilient tongue is allowed to be pushed in against a spring force to allow sliding of said connecting device away from said mounting head in order to release said wiper blade from said mounting head, wherein said mounting head has an at least substantially U-shaped cross-section at the location of its attachment to said connecting device, and wherein each leg of said U-shaped cross-section comprises clamping members formed as inwardly bend edges at the end of said legs, which engage around longitudinal sides of said connecting device that face away from each other.

6. A windscreen wiper device according to claim 5, wherein said hole is provided in a base of a U-shaped cross-section of said mounting head.

7. A windscreen wiper device, comprising an elastic, elongated carrier element, as well as an elongated wiper blade of a flexible material, which can be placed in abutment with a windscreen to be wiped, which wiper blade includes at least one groove, in which groove a longitudinal strip of the carrier element is disposed, and a connecting device for detachably connecting said wiper blade directly to a reciprocating mounting head through a bayonet connection, wherein said connecting device is coupled to said carrier element and covers a first terminal end of said longitudinal strip to engage said mounting head adjacent said end of said wiper blade, wherein an end cap covers a second terminal end of said longitudinal strip, wherein said connecting device and an end cap are disposed at opposite ends of said wiper blade, wherein said connecting device comprises at least one resilient tongue of said bayonet connection engaging in a correspondingly shaped hole of said bayonet connection provided in said mounting head, and wherein said resilient tongue is allowed to be pushed in against a spring force to allow sliding of said connecting device away from the mounting head in order to release said wiper blade from the mounting head.

* * * * *